United States Patent [19]

Claxton

[11] Patent Number: 4,621,488
[45] Date of Patent: Nov. 11, 1986

[54] OSCILLATORY SHAKER RAIL HARVESTER

[75] Inventor: Gerald L. Claxton, Fresno, Calif.

[73] Assignee: Up-Right, Inc., Berkeley, Calif.

[21] Appl. No.: 636,158

[22] Filed: Jul. 31, 1984

[51] Int. Cl.$^4$ ............................................. A01D 46/26
[52] U.S. Cl. ................................. 56/330; 56/328 TS
[58] Field of Search ............ 56/1, 328 TS, 330, 328 R

[56] References Cited

U.S. PATENT DOCUMENTS

| | | | |
|---|---|---|---|
| 4,173,859 | 11/1979 | Goldsmith et al. | 56/330 |
| 4,198,801 | 4/1980 | Claxton | 56/330 |
| 4,207,727 | 6/1980 | Poytress | 56/330 |
| 4,286,426 | 9/1981 | Orlando et al. | 56/330 |
| 4,336,682 | 6/1982 | Orlando | 56/330 |
| 4,391,085 | 7/1983 | Harris et al. | 56/330 |

Primary Examiner—Robert Peshock
Assistant Examiner—David I. Tarnoff
Attorney, Agent, or Firm—Phillips, Moore Lempio & Finley

[57] ABSTRACT

A picking head for a mechanical grape harvester, the picking head having an oscillatable frame and a pair of opposed shaker rails supported on and below the picking head frame. Two sets of longitudinally spaced counterweights are mounted on the picking head frame for rotation about vertical axes, each set including upper and lower eccentric weights. The weights are rotated so that the longitudinal forces cancel out and the transverse forces are additive. The rotative forces of the upper and lower weights in each set are 180° out of phase with each other and related to each other in magnitude so as to minimize the amount of transverse reactive force transmitted from the picking head to the main frame of the harvester. A link suspension enables the center of oscillation of the picking head to be below the picking head frame.

18 Claims, 9 Drawing Figures

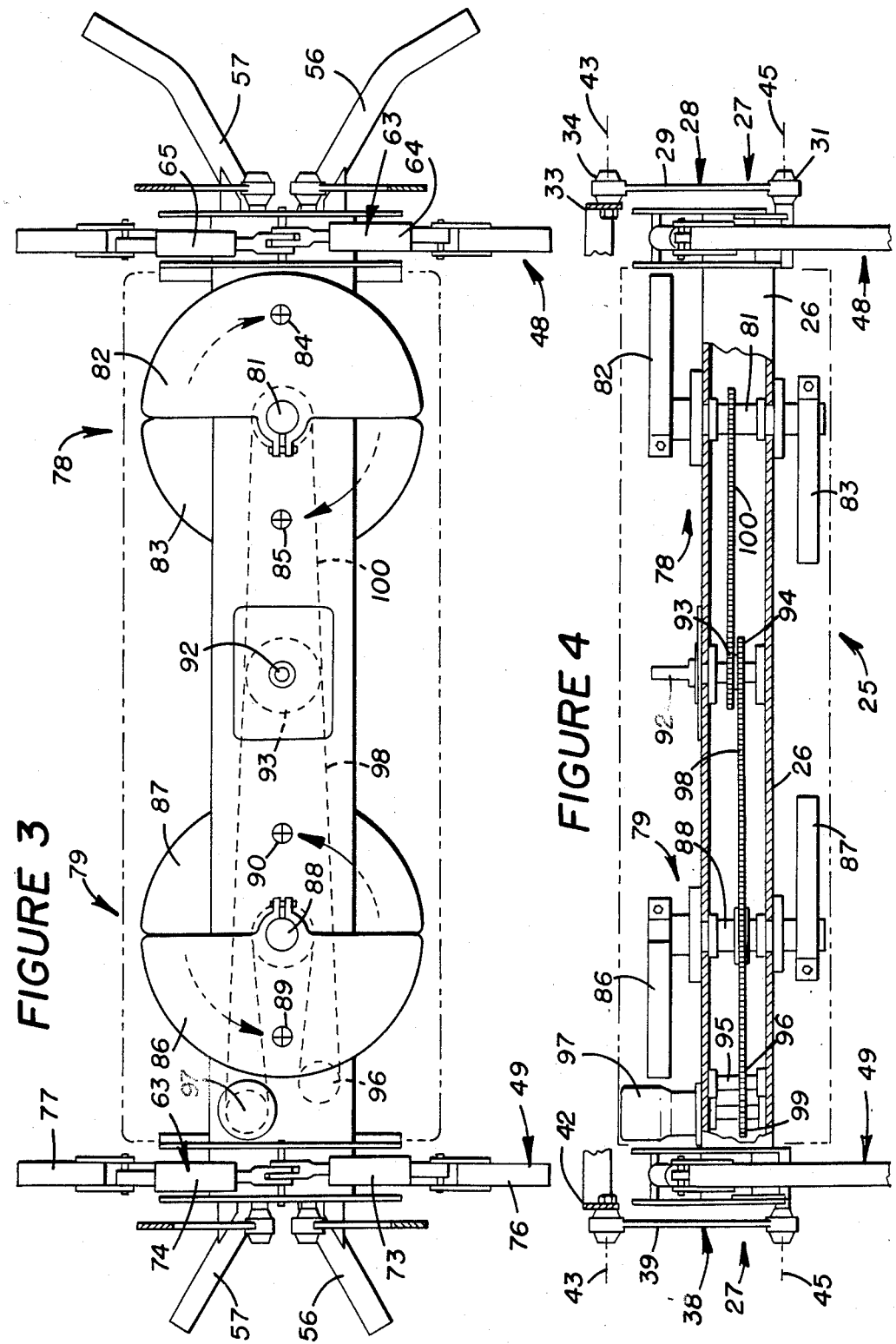

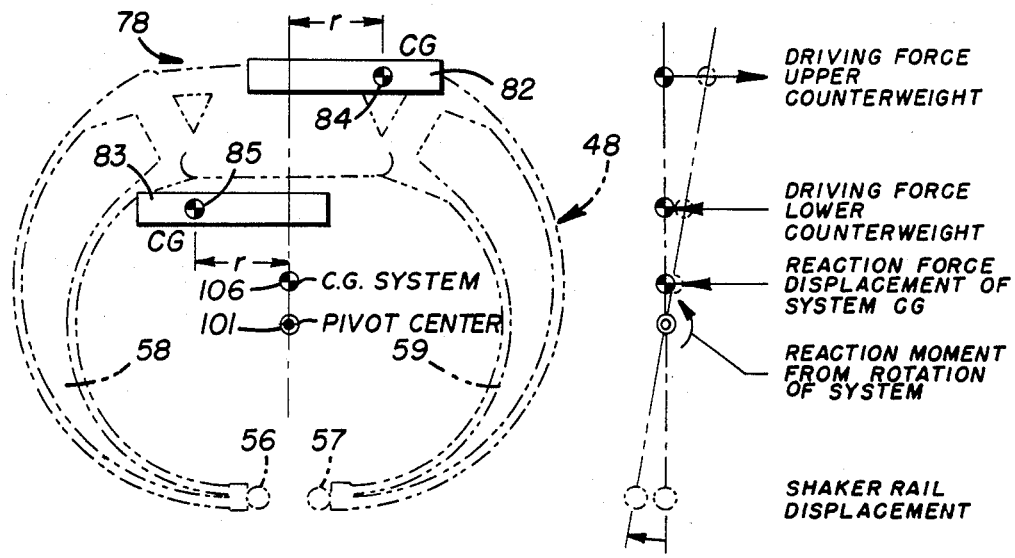
FIGURE 6  FIGURE 7
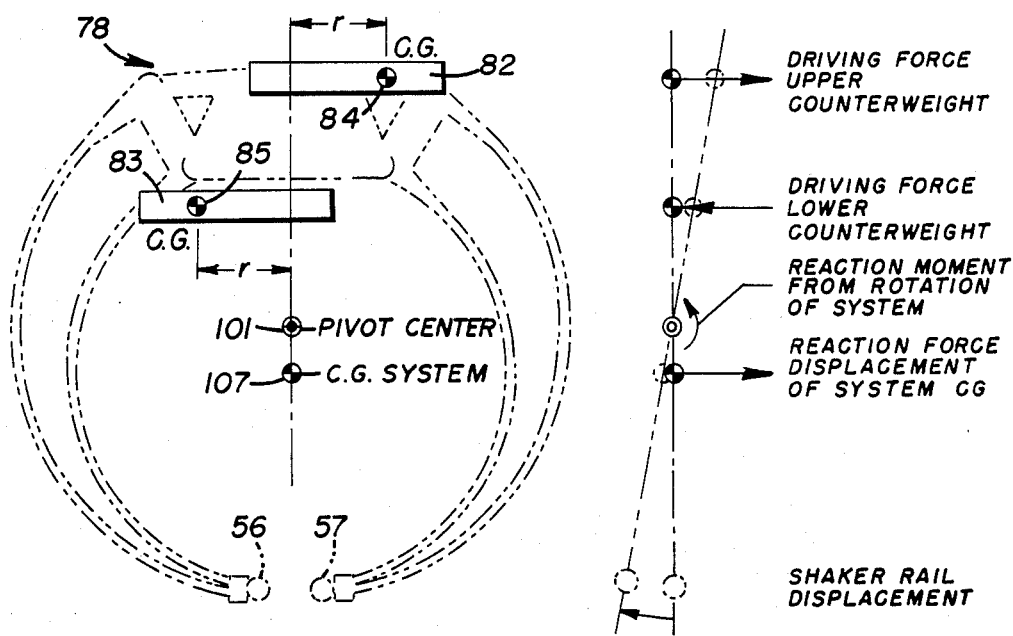
FIGURE 8  FIGURE 9

OSCILLATORY SHAKER RAIL HARVESTER

BACKGROUND OF THE INVENTION

This invention relates to the mechanical harvesting of trellis-supported grapevines.

A typical vineyard consists of a series of rows of stakes which support an arrangement of horizontal and parallel trellis wires running along the rows to form a trellis system for supporting the individual grape vine growth and the attendant fruit thereon. A generally vertical vine trunk is typically located at each stake with the cordons or canes of the vine being trained longitudinally on and along the trellis wires. The layout of the modern vineyard is relatively standardized with about 500 vines per acre.

All commercially succesful harvesting machines to date have been based on some means of agitating or shaking the vines and fruits to cause detachment of the fruit.

For example, striker rod machines use a series of striker rods which swing back and forth, into and out of the foliage, to dislodge the fruit largely by direct contact. Typically, four banks of 3-foot long, ¾-inch diameter fiberglass rods are positioned in vertical planes with the rods being oscillated horizontally baout their forward ends so that the free ends of the rods whip back and forth rapidly to strike the grapes from the vines. The striker rod type of harvester is exemplified by U.S. Pat. No. 3,688,428 to D. Horn, and U.S. Pat. No. 4,016,711 to G. Claxton.

In recent years, machines have been developed for shaking the vine trunks and trellis system to remove the fruit. In particular, this system uses opposed shaker rails which engage the vine trunks and/or trellis parts therebetween as the machine travels down the row. The shaker rails are oscillated back and forth rapidly to shake the vines so that the inertia of the fruit will cause the fruit to be dislodged from the shaking vine. Examples of shaker rail harvesters are shown in U.S. Pat. Nos. 4,179,871 and 4,198,801 to G. Claxton.

Additionally, harvesting machines of the shaker-striker type are presently in commercial use, combining the use of pivotal striker rods and oscillating shaker rails to cause fruit removal. An example of a shaker-striker machine is shown in U.S. Pat. No. 4,250,700 to D. Horn and G. Claxton.

With regard to the shaker rail type harvester, there have been various ways in which the shaker rails have been mounted for back and forth horizontal movement transverse to the row being harvested. Typically in commercial harvesters, a picking head frame is mounted on the harvesting machine frame, with the picking head frame being free to swing back and forth so that the picking head can center itself on the row of vines being harvested.

In one relatively early arrangement, the shaker rails were mounted on the picking head frame by telescoping slides, as shown in U.S. Pat. No. 4,172,352 to Mr. McCarthy et al., so that the rails are translated back and forth relative to the picking head frame.

Another type shaker-rail suspension is shown in the above mentioned U.S. Pat. No. 4,198,801, to G. Claxton, wherein the rails are suspended from the picking head frame by a link arrangement so that the shaker rails swing back and forth relative to the vine. A drive unit acting between the shaker rails and the picking head frame moves the shaker rails back and forth.

Yet another type of shaker rail suspension is that shown in U.S. Pat. No. 4,286,426 to Orlando and Fitzmaurice and U.S. Pat. No. 4,336,682 to Orlando, wherein the shaker rails are essentially integral with the picking head frame, and the entire picking head frame is oscillated so that the shaker rails move back and forth relative to the main frame of the machine.

The present invention is particularly directed to this latter general type of machine.

In the particular form of this type of machine which is shown in U.S. Pat. Nos. 4,286,426 and 4,336,682, the picking head frame is driven by two sets of eccentric weights, symmetrically arranged one on each side of the picking head frame, which are rotated about horizontal axes parallel to the longitudinal axis of the main harvester frame.

One particular drawback of this arrangement is that considerable reaction forces are transmitted from the oscillating picking head frame back into the main frame of the machine. This reaction force results from the fact that the picking head frame is mounted on the main frame so that the center of rotation of the picking head is fixed relative to the main frame of the machine and above the center of gravity of the picking head.

As the two sets of weights rotate, vertical forces, with a moment arm equal to the distance from the center of the weights to the center of rotation, i.e. the axis of pivotal movement, will cause the picking head frame unit to oscillate about its pivotal center of rotation. At the same time, since the center of gravity of the system is not at the center of rotation, the center of gravity will move horizontally back and forth as the picking head oscillates, and with a reactive force equal to the dynamic mass of the picking head times the acceleration of the movement of the center of gravity. There is no way in this system wherein the forces can be balanced, and thus there will be a reactive moment acting on the pivotal connection (and back into the main frame of the machine) equal to the dynamic mass of the picking head times the acceleration of the center gravity times the distance between the center of gravity and the axis of rotation.

The reactive force can be decreased by decreasing the distance between the center of gravity and the axis of rotation. However, the center of gravity is designed to be below the axis of rotation so that the picking head will hang downwardly and center itself in the machine. A decrease in the distance will lessen the described centering effect. Thus, a reduction in the distance between the center of gravity and the axis of rotation will desirably reduce the reactive forces transmitted back into the frame but will undesirably reduce the centering ability, and vice versa. As a consequence, self centering cannot be achieved without an attendant reactive force that will be transmitted back into the main frame of the harvester.

Another drawback of the arrangement shown in U.S. Pat. Nos. 4,286,426 and 4,336,682 is that as the shaker rails are driven back and forth horizontally, they will be driven in one direction with markedly less force than in the other, so that the "snapping" action (needed for fruit removal) at the end of movement in that direction is correspondingly lessened. The difference in force is due to the fact that the two sets of weights, one on each side of the centerline, are both belt-driven in the same direction of rotation from drive pulleys coaxial with the center of rotation of the picking head frame. As a consequence, there is a force equal to the sum of the tensions in the two drive belts times the radius of the drive pulley which adds to the force of the eccentric weights in one direction of picking head rotation and subtracts from the eccentric weight force in the opposite direction of picking head rotation.

Yet another disadvantage of the arrangement shown in U.S. Pat. Nos. 4,286,426 and 4,336,682 is that the overall height of the picking head unit is undesirably great, requiring a harvesting machine with a high main frame, thus increasing the potential for instability in a sloping vineyard. The main frame brackets on which the picking head is mounted, and the portion of the picking head vertically above the shaker rails must be high enough off the ground so that the machine can clear the tops of the grape stakes and the heavy anchor posts at the ends of the row. As is seen from these patents, the supports for the picking head and the picking head itself extend physically below the fixed axis of pivotal movement. Also, the center of gravity of the picking head is slightly above the lowermost parts of the picking head which are vertically above the shaker rails. In order to have such a high center of gravity, and to accommodate the use of weights which rotate about horizontal axes, the picking head must extend vertically a significant distance above its axis of pivotal movement. Then, in order to suspend the picking head from the main frame of the harvester and to allow its oscillating movement relative to the main frame, the main frame must have a very significant height above the ground.

As is apparent from the foregoing, there is a need for a mechanical grape harvester of the shaker rail type with an oscillating frame wherein there is a minimum of reactive force transmitted back into the main frame, wherein the shaker rail forces are the same in either horizontally transverse direction relative to the row being harvested, and wherein the overall height of the picking head can be minimized.

SUMMARY OF THE INVENTION

The present invention is directed towards overcoming one or more of the disadvantages and filling the needs set forth above.

In the main aspect of the present invention, a picking head is provided for a row harvesting machine, the picking head having an elongated frame with parallel shaker rails mounted thereon, and first and second longitudinally spaced counterweight sets mounted on the picking head frame for rotation about vertical axes, each set having upper and lower eccentric weights, and drive means for rotating the counterweight sets with the direction of rotation of the two being in opposite direction, with the rotative forces of the two upper weights being longitudinally opposed and transversely additive, with the rotative forces of the two lower weights being longitudinally opposed and transversely additive, and with the upper and lower weights of each set being 180° out of phase with each other.

In another aspect of the invention, the picking head is mounted on the main frame of a harvesting machine for oscillatory movement of the picking head by a link suspension comprising a first pair of upwardly diverging links with spaced apart lower ends pivotally connected to one end of the picking head frame and upper ends pivotally converted to the main frame and a second pair of similarly arranged links of the other end of the picking head frame.

In yet another aspect of the invention, the two counterweight sets on the picking head frame have vertical shafts driven by a hydraulic motor mounted on the picking head frame.

Other aspects of the invention will become apparent in the course of the following detailed description.

BRIEF DESCRIPTION OF THE DRAWINGS

In the drawings, forming part of this application, and in which like parts are designated by like reference numerals throughout the same:

FIG. 3 is a sectional view, taken on line 3—3 of FIG. 1, looking down at the picking head;

FIG. 4 is a side elevational view of the picking head;

FIG. 6 is a diagram of the dynamic elements of a picking head with short shaker rail support arms;

FIG. 7 is a force diagram of the system of FIG. 6;

FIG. 8 is a diagram of the dynamic elements of the pciking head with long shaker rail support arms; and, FIG. 9 is a force diagram of the system of FIG. 8.

DESCRIPTION OF THE PREFERRED EMBODIMENTS

Figure 1:
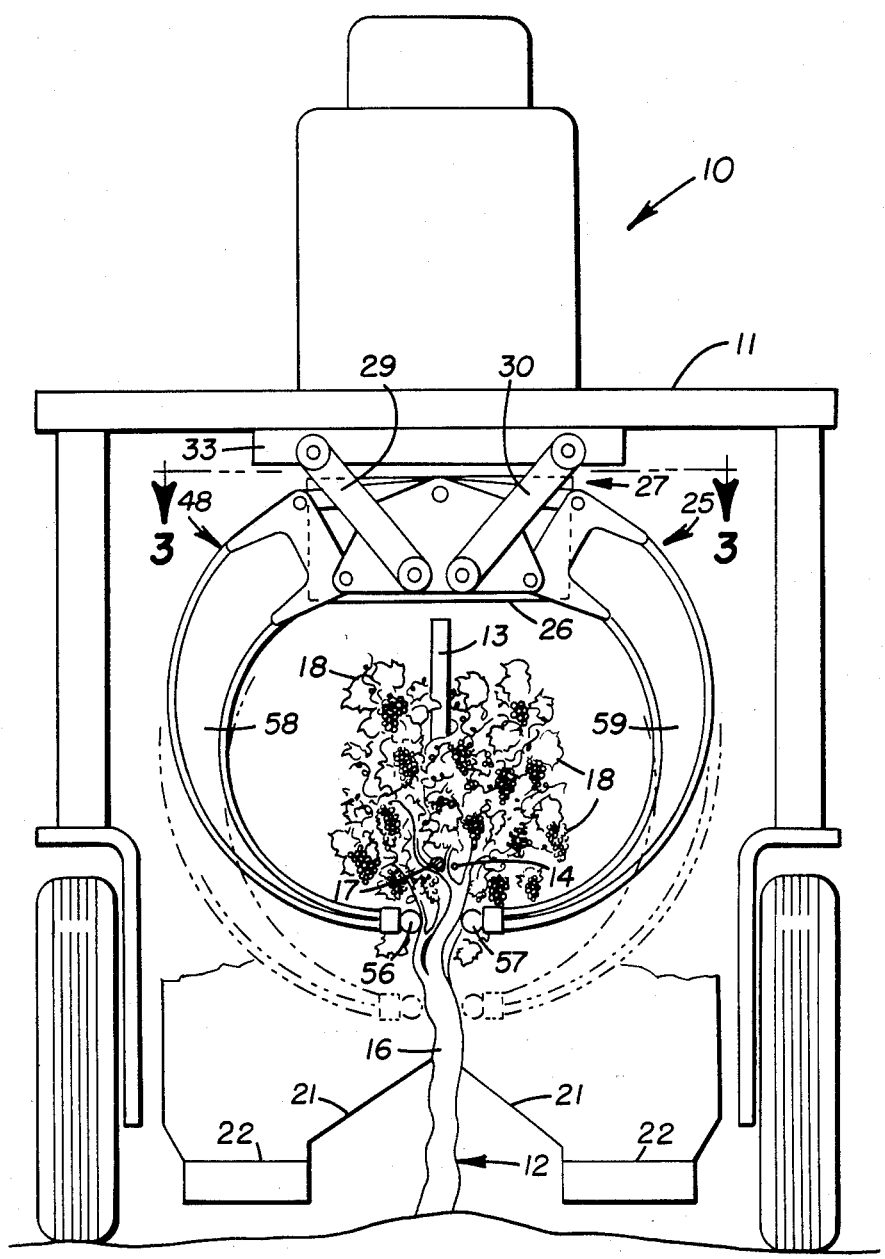
FIG. 1 is a front elevational view of a harvesting machine having a picking head constructed in accordance with the present invention.

Referring now to the drawings, wherein are disclosed preferred embodiments of the invention, FIG. 1 illustrates a mechanical grape harvester 10 having a wheeled main frame 11 adapted to straddle and move along a row of trellis-supported grape vines 12, with the longitudinal centerline of the harvester being generally centered on the row. As is conventional, trellis posts 13 are spaced apart along the row, with a horizontal trellis wire 14 being secured to the posts and extending along the length of the row. Typically, a vine will be planted at each post, each vine having a generally vertical trunk 16 and cordons (or canes) 17 trained along the trellis wire in both directions from the trunk so that the vine growth and grapes 18 will have the trellis wire 14 centrally thereof.

As is conventional, the harvester 10 has fruit catchers 21 and conveyors 22 suspended from the frame 11 to catch the harvested fruit and convey it to suitable fruit collection apparatus (not shown).

The improvement of the present invention resides in the picking head 25 which is carried by the wheeled frame 11.

Figure 2:
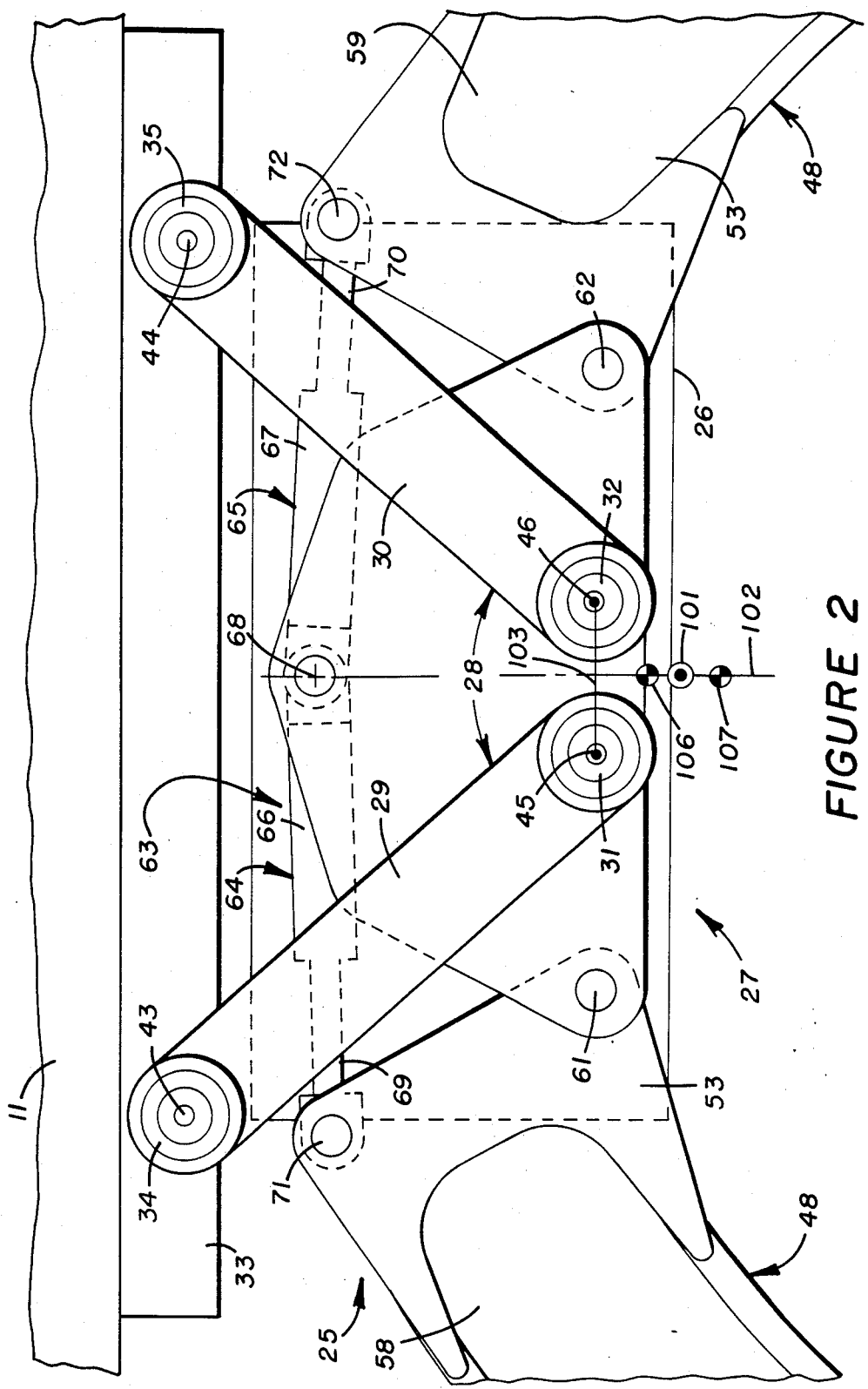
FIG. 2 is an enlarged elevational view of the upper portion of one end of the picking head.

As best seen in FIGS. 1–3, picking head 25 includes an elongated and generally box-shaped frame 26 extending lengthwise of the main frame 11 and means 27 for mounting the picking head frame 26 on the main frame 11 for oscillatory movement of the picking head frame 26 about a pivot axis which extends lengthwise of the harvester 10.

In particular, the mounting means 27 comprises a front pair 28 of upwardly diverging links 29 and 30 at one end of the picking head frame 26, with the lower ends of the links being spaced apart and pivotally connected to the picking head frame 26, as by rubber torsion bushings 31 and 32, and with the upper ends of the links 29 and 30 being pivotally connected to cross bar 33 of the main frame 11, as by rubber torsion bushing 34 and 35. The mounting means 27 also includes a rear pair 38 of upwardly diverging links 30 and 40 which are similarly pivotally connected to the picking head frame 26 and crossbar 42 of the main frame 11. The upper and lower ends of the front links 29 and 30 have the same axes of pivotal movement 43, 44, 45 and 46 as the corresponding upper and lower ends of the rear links 39 and 40 respectively.

The picking head 25 further includes first and second longitudinally spaced rail supports 48 and 49, each rail support having an inverted-C shape with lower opposed ends 51 and 52 and an upper mid-portion 53 which is mounted to the picking head frame 26 for unitary movement therewith. A pair of spaced apart and longitudinally-extending shaker rails 56 and 57 are mounted on the lower opposed ends of the rail supports 48 and 49.

In more particular, rail support 48 comprises a pair of curved arm members 58 and 59 extending downwardly from the picking head frame 26, the arm members being pivotally connected to the picking head frame 26 by eccentric pins 61 and 62. A bias means 63 for acting between the picking head frame 26 and the arm members 58 and 59 is provided to resiliently hold the shaker rails 55 and 56 at a desired spacing from each other. In the present embodiment, the bias means 63 comprises a pair of hydraulic cylinders 64 and 65 having housings 66 and 67 pivotally connected to the picking head frame 26 by pin 68, and pistons 69 and 70 pivotally connected to arm members 58 and 59 by pins 71 and 72, respectively. Cylinders 64 and 65 are connected by hoses (not shown) to a suitable source of hydraulic fluid and operate so that when fluid under pressure is applied to the cylinder, pistons 69 and 70 will extend fully and hold the arm members 58 and 59 against movement relative to the picking head frame 26, with the shaker rails 56 and 57 being held in a fixed spaced-apart relation as long as the rails are not subjected to a spreading force greater than that exerted by cylinders 64 and 65. If the rails 56 and 57 encounter an object having a greater diameter then the normal spacing between the rails, as, for example, an end post, the rails can resiliently yield apart.

The eccentric pins 61 and 62 are rotatable in a conventional manner so that the spacing between the shaker rails 55 and 56 (with full extension of pistons 69 and 70) can be adjusted to a desired amount.

The bias means 63 also includes a pair of hydraulic cylinders 73 and 74 similarly connected to the picking head frame 26 and arm members 76 and 77 of rail support 49 at the other end of the picking head frame.

In order to drive the picking head frame to reciprocate the shaker rails 56 and 57, a pair of longitudinally spaced counterweight sets 81 and 82 are mounted on the picking head frame for rotation about vertical axis. As best seen in FIGS. 3 and 4 counterweight set 81 comprises a vertical shaft 83 journaled in picking head frame 26 and having upper and lower semi-circular weight members 84 and 85 eccentrically fixed to shaft 83 so that the centers of gravity 86 and 87 of the upper and lower weight members 84 and 85 are 180° apart relative to the vertical axis of shaft 83. Likewise, counterweight set 82 comprises upper and lower semi-circular weight members 86 and 87 fixed to vertical shaft 88 such that the centers of gravity 89 and 90 of the upper and lower weights are 180° apart relative to the vertical axis of shaft 88.

A vertical shaft 92, rotatably journaled in the picking head frame 26 between the two counterweight sets 78 and 79, has a pair of idler sprockets 93 and 94 fixed thereto. A vertical shaft 95 rotatably journaled at the rear end of the picking head frame 26 has an idler sprocket 96 fixed thereto. In order to drive the counterweight sets, a hydraulic motor 97 is mounted vertically on the picking head frame 26. A first drive chain 98 is trained around drive sprocket 99 of motor 97, idler sprockets 94 and 96 and a sprocket fixed to shaft 88 of the first counterweight set. A second drive chain 100 is trained around idler 93 and a sprocket fixed to shaft 81 of the first counterweight set 78.

The intermediate idler sprockets 93 and 94 shorten the chain reaches between the two shafts 81 and 88 of the counter-weight sets, and thus greatly reduce chain slap during operation. Additionally, the intermediate shaft 921 provides a convenient location for attachment of a tachometer cable.

As may be seen from FIG. 3, rotation of motor 97 in a clockwise direction (viewed from above) will cause the weight members 86 and 87 of the second counterweight set 79 to rotate in a counter-clockwise direction, while the weight members 82 and 83 of the first counterweight set 78 are driven in a clockwise direction. The two counterweight sets 78 and 79 are also arranged on the picking head frame 26 such that when the center of gravity 84 of upper weight members is further forward, the center of gravity 89 of the upper weight member 86 is furthest rearward, and vice versa. Because of the opposite direction of rotation, the centers of gravity 84 and 89 of the upper weight members will both travel together transversely of the picking head frame. That is, they will both move together to the right, or both move together to the left. As a consequence, the rotative forces of the two upper weights will be opposed to each other out longitudinally of the frame, and be additive to each other in a direction transversely of the picking head frame.

In like manner, the rotative forces of the two lower weights 83 and 87 will be opposed to each other longitudinally of the picking head frame and additive to each other transversely of the frame 26.

As is apparent, with the rotative forces of the two upper weights 82 and 86 being equal to each other, and with the rotative forces of the two lower weights 83 and 87 also being equal to each other, then the components of rotative force longitudinally of the picking head frame 26 will cancel out, and only forces transverse of the frame will be imparted to the picking head frame 26 by the rotating sets of counterweights.

Figure 5:
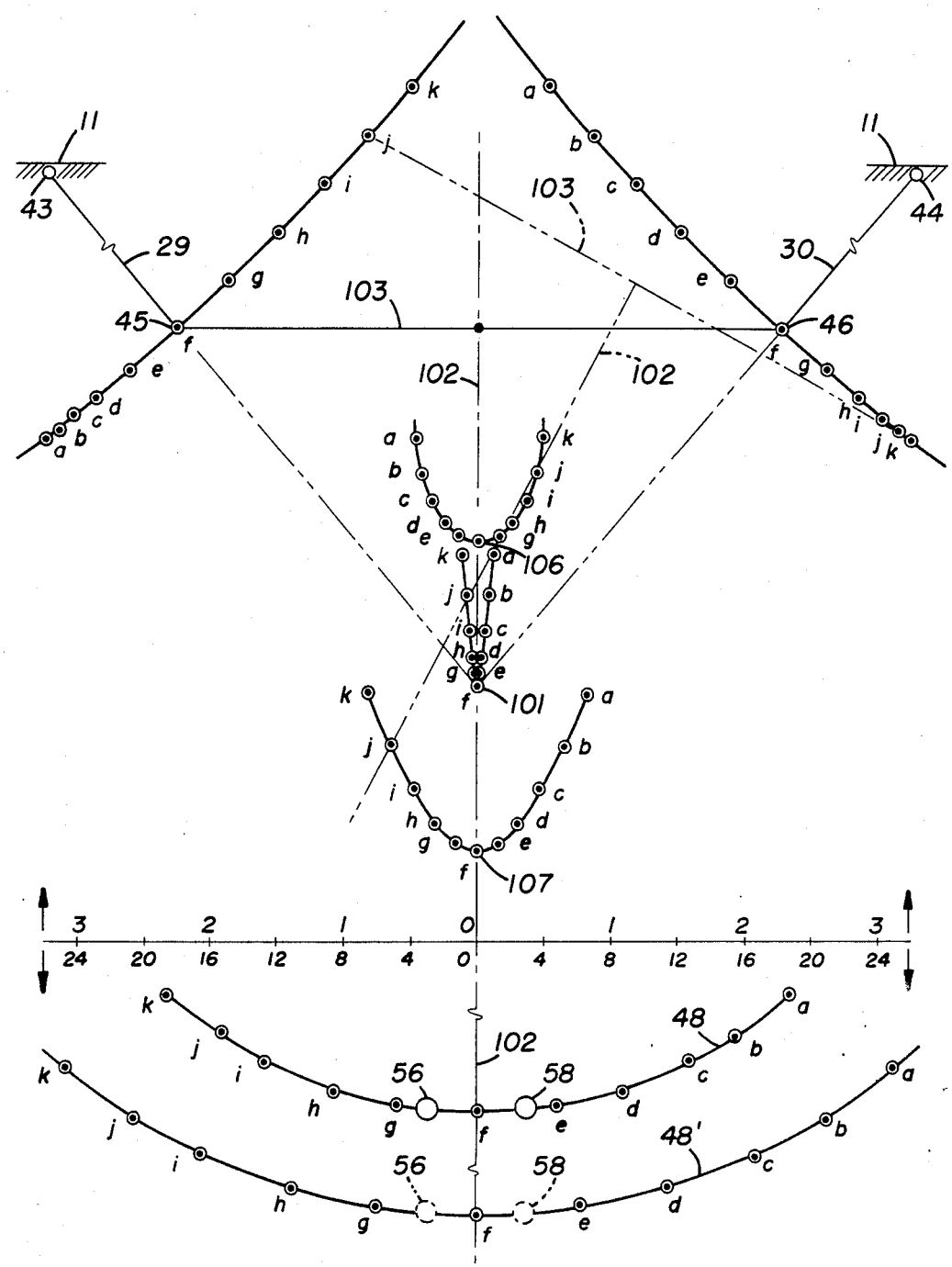
FIG. 5 is a diagram illustrating the movement of various parts of the picking head during operation.

The operation of the picking head is best illustrated by references to FIGS. 2 and 5. With the diverging link suspension of the present invention, the picking head will oscillate about a horizontal pivotal axis 101 which passes through the vertical central axis 102 of the picking head, such central axis being the perpendicular bisector of the line 103 between the pivotal axes 45 and 46 of the lower ends of links 29 and 30. With a balanced picking head and equal length links 29 and 30, the axis 101 of pivotal movement will be at the intersection of the extended centerlines of the links 29 and 30 when the system is at rest.

The position of the center of gravity of the picking head will depend, amongst other factors, on the length of the rail supports 48 and 49. For example, with the relatively short rail supports illustrated in solid lines in FIG. 1, the center of gravity 106 (FIG. 2) of the picking head may be at an elevation above the axis 101 of pivotal movement. On the other hand, if longer rail supports 48', such as illustrated in dotted lines in FIG. 1 are used, the center of gravity of the picking head will be lower, and may be at the position illustrated at 107 in FIG. 2.

FIG. 6 illustrates the manner in which the oscillatory pivotal axis 101 and the centers of gravity 106 and 107 of a short or a long rail support system will move in response to swinging movement of the links 29 and 30. With the system of rest, i.e. with the link axes 45 and 46 at the "f" positions, the pivotal axis 101, and the centers of gravity 106 or 107 will be at their "f" positions, all on the central axis 102 of the picking head. If the picking head is swung so that the axis 45 of link 29 is moved to its "j" position, the axis 46 of link 30 will be moved to its "j" position and the pivotal axis 101 position and the pivotal axis 101 and centers of gravity 106 or 107 will have moved to their "j" positions. The letters "a" through "k" illustrate other positions of the elements. In FIG. 5 the units of measurement are in inches, with links 29 and 30 each being 16 13/16 inches in length. FIG. 5 also illustrates, in the lower portion thereof, the amount of shaker rail movement produced by pivotal movement of the picking head frame, with reference numerals 48 and 48' designating the paths of movement of the rails in a short or long support arm system, respectively. Point "f" on both curves is the position of a point centered between the shaker rails when the system is at rest. This center point lies on central axis 102 at a fixed distance from the pivotal axis 101.

As is shown in FIG. 5, oscillatory movement of the picking head 25 is either direction from its at rest, or "f" position, will cause the pivotal axis 101 and the center of gravity 106 or 107 to move upwardly. As a consequence, there will be a restoring force seeking to center the picking head relative to the centerline of the harvester 10, regardless of whether the picking head system has its center of gravity above or below the pivotal axis 101. In a system wherein the picking head is constrained to pivot about a fixed axis, as in the previously referred to U.S. Pat. Nos. 4,286,426 and 4,336,682, if the center of gravity of the picking head is above the axis of pivotal movement, the system will be unstable since the picking head will seek to invert itself. Consequently, a picking head of that type must be designed so that its center of gravity is below the axis of pivoted movement. Such a requirement, together with the requirement of physical structure at the axis of pivotal movement inherently require a thicker package and higher mounting of the system (to provide clearance of stakes 13 and end posts) than in the present invention wherein the center of gravity can be above the axis of pivotal movement and wherein no physical structure is required at the axis of pivotal movement.

Typically, harvesting will be carried out with the reciprocating movement of the shaker rails 56 and 57 being in the order of about six inches. Thus, if the harvester is centered on the row, the center point between the shaker rails will move from point "f" about 3 inches towards point "e", then back to point "f", then about 3 inches towards point "g" and back to "f" in a full cycle of rotation of the counterweight sets 78 and 79. The amount of vertical movement of the pivotal axis 101 of the picking head during this cycle of operation will be quite small, i.e. in the order of ¼ inch.

If the harvester is driven off center, the shaker rails will remain centered on the row, causing the picking head to rotate about its pivotal axis so that the central axis 102 of the picking head will center itself on some point along the arcs 48 or 48' of FIG. 5. For example, suppose the harvester 10 is sufficiently off center relative to the vine row row so that the central axis centers itself on point "h." Then, as the counterweight sets rotate through a full 360°, the centerpoint between the rails 56 and 57 will move from "h" about three inches towards "g," back to "h," about three inches towards "i," and then back to "h."

If the harvester is driven to the left from the center of the row, there will be somewhat more force exerted on the row when the shaker rails move to the right then when they move to the right, and the opposite is true if the harvester is driven off-center to the right. This tracking force is the same for off-center driving in either side of the row, since the vertical motor 97 and drive chain system do not impose any horizontal torque on the picking head frame.

The present system is also advantageous in that an even high speed shaker rail movement is provided in both directions, whether the harvester is centered, or off-center, relative to the row, resulting in a "snapping" action at both reversals of shaker rail movement in a cycle of operation. This in turn results in an impound fruit removal and permits lower oscillation rates.

FIGS. 6 and 7 illustrate the forces in a short shaker rail support system, i.e. a system in which the center of gravity of the picking head is above the pivotal axis 101. As described above, the pivotal axis 101 is at the imaginary point relative to the picking head frame where the linkage centerline intersect when at rest. As the picking head displaces from the driving force of the rotating counterweights, the axis of pivotal movement also displaces, with pivotal movement of the picking head taking place rotate about the instantaneous location of that axis.

When the counterweights 82 and 83 have rotated to the position illustrated in FIG. 6, the upper and lower weights will impose driving forces (FIG. 7) on the picking head frame in opposite horizontal directions, and there will be a a horizontal reaction force resulting from the displacement of the system center of gravity. It should be noted that when the counterweights are rotating, the movement of their mass will provide a driving force to the picking head. The mass of the oscillating picking head, and its consequent center of gravity, does not include the mass of the driving elements, i.e. the eccentric portions of the counterweight sets.

The horizontal driving and reaction forces must add to zero. That is, the driving force from the upper counterweight less the driving force from the lower counterweight will equal the reaction force from the displacement of the system center of gravity. Since the pivotal axis 101 is unconstrained and free to move, there are no horizontal reaction forces on the pivotal axis which can be fed back through the linkage system to the main frame of the machine.

The moments about the pivotal axis must also add to zero with the reaction mounts being equal to the driving moments. Thus, the reaction moment from rotation of the system (i.e. the rotation which results in shaker rail movement) less the reaction moment from the displacement of the system center of gravity (the reaction force times the distance from the center of gravity to the pivotal axis) is equal to the driving moment of the upper counterweight 82 (its driving force times the distance from is center to the pivotal axis 101) less the driving moment of the lower counterweight 83 (its driving force times the distance from its center to the pivotal axis 101).

The driving forces of the counterweights 82 and 83 are determined by the masses of these counterweights and the distance "r" from the centers of gravity of the counterweights to the shaft 81 on which they are mounted the moments of these driving forces are determined by the geometry of the linkage system. The reaction forces and moments are determined by the mass of the picking head and geometry thereof.

FIGS. 6 and 7 illustrate the forces at one end of the picking head frame. The same forces, from the action of the other counterweight set 79, will be present at the other end of the picking head frame. Again, the horizontal drive forces of the two counterweight sets 75 and 78 will cancel longitudinally of the picking head and will be additive in a transverse direction.

FIGS. 8 and 9 illustrate the forces in a long shaker rail support system wherein the center of gravity 107 of the system is below the pivotal axis 101. In this system, the reaction force from the displacement of the system center of gravity 107 will equal the driving force of the lower counterweight 83 less the driving force of the upper counterweight 82. Again, there will be no horizontal reaction force from displacement of the pivotal center and then no horizontal forces therefore to be fed back through the suspension linkage to the main frame 11 of the harvester.

Moment equilibrium is the same as in FIG. 7, since the direction of the moments are the same. Thus, the reaction moment from the rotation of the system, plus the moment of the reaction forces from displacement of the system center of gravity 107 will equal the moment of the upper driving force less the moment of the lower driving force, all moments being relative to the pivotal axis 101.

It is not believed that the proportions of the support linkage are critical. However it is preferred that the length of the links 29 and 30 be large compared to the distance from the lower pivotal points thereof to the pivotal axis 107. The actual dimensions are to be determined by the physical constraints of available space in the harvester for which the picking head is intended to be used. The angle of the links at rest is shown herein as being about 45° from the vertical. As the linkage becomes more vertical, the tension forces are advantageously decreased, but the support system will not absorb out of balance conditions as well. The choice of 45° is a compromise to keep the resulting tension forces down while providing more freedom of motion for absorption of operating imbalance and more tolerance of manufacturing inaccurances.

The balance of the overall system may be achieved most readily by adjusting the counterweight mass. The system stroke may also be adjusted by varying the counterweight mass. A fine tuning of the balance can be made, to adjust for manufacturing variations, by adjusting the angle, and therefore, the intersection point (pivotal axis) of the linkage members.

As is apparent, the present invention provides a shaker rail system in which the picking head may be designed to pivot about the best location as may be dictated by constraints of the harvester and the vine geometry and which will have a minimum of vibration transmitted back into the main frame of the harvester.

The foregoing description of a preferred embodiment has been presented for purposes of illustration and description. It is not intended to be exhaustive or to limit the invention to the precise form described, and obviously many modifications and variations are possible in light of the above teaching. The embodiment was chosen and described in order to best explain the principles of the invention and is practical application to thereby enable others in the art to best utilize the invention in various embodiments and with various modifications as are suited to the particular use contemplated. The above description has been directed to a mobile grape harvester, and in this intended used the picking head and suspension system fulfills the need for a picking head which is very simple in construction, which has a minimal height, which has a high harvesting efficiency and a low amount of vibration. However, the system of the present invention can also be used in other harvesters wherein some or all of the advantages are needed. It is intended that the scope of the invention be defined by the claims appended hereto.

I claim:

1. A picking head for a harvesting machine having a wheeled main frame adapted to straddle and move along a row of plants which have vertical trunks spaced along the row, with the longitudinal centerline of said main frame being in general alignment with the length of the row, said picking head comprising:

an elongated picking head frame extending lengthwise of said main frame, first and second longitudinally-spaced rail supports, each rail support having an inverted-C-shape with lower opposed ends and an upper mid-portion spaced above said ends, means for mounting the mid-portion of each of said rail supports to said picking head frame for unitary movement therewith, a pair of spaced apart and longitudinally-extending shaker rails mounted on the lower opposed ends of said rail supports, first and second longitudinally-spaced counterweight sets mounted on said picking head frame for rotation about vertical axes, each set having upper and lower eccentric weights, drive means for driving said counterweight sets with the direction of rotation of said first set being opposite to the direction of rotation of said second set, with the rotative forces of said upper weights of said first and second sets being opposed to each other longitudinally of said picking head frame and additive to each other transversely of said picking head frame, with the rotative forces of said lower weights of said first and second sets being opposed to each other longitudinally of said picking head frame and additive to each other transversely of said picking head frame, and with the upper and lower weights of each set being 180° out of phase with each other, and means for mounting said picking head frame on said main frame for oscillatory pivotal movement of said picking head frame relative to said main frame.

2. A picking head as set forth in claim 1, wherein said upper and lower weights of said first counterweight set are mounted on a first vertical shaft, wherein said upper and lower weights of said second counterweight set are mounted on a second vertical shaft, and wherein said drive means includes hydraulic motor mounted on said picking head frame and a horizontal drive chain means trained around said first and second shafts and driven by said hydraulic motor.

3. A picking head as set forth in claim 2, wherein each of said rail supports comprises a pair of curved arm members extending from said picking head frame to said rails, said arm members each being pivotally connected to said picking head frame, and wherein said mean for mounting said rail supports to said picking head frame has the further function of acting between said picking head frame and said arm members to resiliently hold said rails at a desired spacing from each other.

4. A picking head as set forth in claim 1, wherein the moments of rotative force of said upper weights of said first and second sets relative to the axis of oscillatory pivotal movement of said picking head frame are equal in magnitude, and wherein the moments of rotative force of the upper weight in each set relative to said axis is greater in magnitude than the moment of rotative force of the lower weight in that set relative to said axis.

5. A picking head as set forth in claim 4, wherein said upper and lower weights of said first counterweight set are mounted on a first vertical shaft, wherein said upper and lower weights of said second counterweight set are mounted on a second vertical shaft, and wherein said drive means includes a hydraulic motor mounted on said picking head frame and a horizontal drive chain means trained around said first and second shafts and driven by said hydrauilc motor.

6. A picking head as set forth in claim 5, wherein each of said rail supports comprises a pair of curved arm members extending from said picking head frame to said rails, said arm members each being pivotally connected to said picking head frame, and wherein said means for mounting said rail supports to said picking head frame has the further function of acting between said picking head frame and said arm members to resilient hold said rails at a desired spacing from each other.

7. A picking head as set forth in claim 1, wherein each of said rail supports comprises a pair of curved arm members extending from said picking head frame to said rails, said arm members each being pivotally connected to said picking head frame, and wherein said means for mounting said rail supports to said picking head frame has the further function of acting between said picking head frame and said arm members to resiliently hold said rails at a desired spacing from each other.

8. A harvesting machine for harvesting fruit from a row of plants, said harvesting machine comprising:
a mobile main frame adapted to straddle and move along said row, with the longitudinal centerline of said frame being in alignment with the length of said row,
an elongated picking head frame extending lengthwise of said main frame,
first and second longitudinally-spaced shaker rail supports, each rail support having an inverted-C-shape with lower opposed ends and an upper mid-portion spaced above said ends,
means for rigidly mounting the mid-portion of each of said shaker rail supports to said picking head frame for unitary movement therewith,
a pair of spaced apart and longitudinally-extending shaker rails mounted on the lower opposed ends of said shaker rail supports,
first and second longitudinally-spaced counterweight sets mounted on said picking head frame for frame, each of said first and second counterweight sets having upper and lower weights each mounted for rotation about a vertical axis,
drive means for driving said first and second counterweight sets with the direction of rotation of said first set being opposite to the direction of rotation of said second set, with the rotative force of said upper weights of said first and second sets being opposed to each other longitudinally of said picking head frame and additive to each other transversely of said shaker frame, and with the rotative force of said lower weights of said first and second sets being opposed to each other longitudinally of said picking head frame and additive to each other transversely of said picking head frame, and with the upper and lower weights of each set being 180° out of phase with each other, and
means mounting said picking head frame on said main frame for oscillatory movement of said picking head frame relative to said main frame.

9. A picking head as set forth in claim 1, wherein said upper and lower weights of said first counterweight set are mounted on a first vertical shaft, wherein said upper and lower weights of said second counterweight set are mounted on a second vertical shaft, and wherein said drive means includes a hydraulic motor mounted on said picking head frame and wherein said first and second shafts are chain driven by said hydraulic motor.

10. A picking head for a harvesting machine having a wheeled main frame adapted to straddle and move along a row of plants which have vertical trunks spaced along the row, with the longitudinal centerline of said main frame being in general alignment with the length of the row, said picking head comprising:
an elongated picking head frame extending lengthwise of said main frame,
first and second longitudinally-spaced rail supports, each rail support having an inverted-C-shape with lower opposed ends and an upper mid-portion spaced above said ends,
means for mounting the mid-portion of each of said rail supports to said picking head frame for unitary movement therewith,
a pair of spaced apart and longitudinally-extending shaker rails mounted on the lower opposed ends of said rails supports,
first and second longitudinally-spaced counterweight sets mounted on said picking head frame for rotation about vertical axes, each set having upper and lower eccentric weights,
drive means for driving said counterweight sets with the direction of rotation of said first set being opposite to the direction of rotation of said second set, with the rotative forces of said upper weights of said first and second sets being opposed to each other longitudinally of said picking head frame and additive to each other transversely of said picking head frame, with the rotative forces of said lower weights of said first and second sets being opposed to each other longitudinally of said picking head frame and additive to each other transversely of said picking head frame, and with the upper and lower weights of each set being 180° out of phase with each other, and
means for mounting said picking head frame on said main frame for oscillatory pivotal movement of said picking head frame relative to said main frame and including a first pair of upwardly diverging links at one end of said picking head frame with the lower ends of said links being spaced apart and pivotally connected to said picking head frame and with the upper ends of said links being pivotally connectable to said main frame, and a second pair of similarly arranged links at the other end of said picking head frame.

11. A picking head as set forth in claim 10, wherein said upper and lower weights of said first counterweight set are mounted on a first vertical shaft, wherein said upper and lower weights of said second counterweight set are mounted on a second vertical shaft, and wherein said drive means includes a hydraulic motor mounted on said picking head frame and a horizontal drive chain means trained around said first and second shafts and driven by said hydraulic motor.

12. A picking head as set forth in claim 11, wherein each of said rail supports comprises a pair of curved arm members extending from said picking head frame to said rails, said arm members each being pivotally connected to said picking head frame, and wherein said means for mounting said rail supports to said picking head frame has the further function of acting between said picking head frame and said arm members to resiliently hold said rails at a desired spacing from each other.

13. A picking head as set forth in claim 10, wherein each of said rail supports comprises a pair of curved arm members extending from said picking head frame to said rails, said arm members each being pivotally connected to said picking head frame, and wherein said means for mounting said rail supports to said picking head frame has the further function of acting between said picking head frame and said arm members to resiliently hold said rails at a desired spacing from each other.

14. A picking head as set forth in claim 10, wherein the moments of rotative force of said upper weights of said first and second sets relative to the axis of oscillatory pivotal movement of said picking head frame are equal in magnitude, and wherein the moments of rotative force of the upper weight in each set relative to said axis is greater in magnitude than the moment of rotative force of the lower weight in the set relative to said axis.

15. A picking head as set forth in claim 14, wherein said upper and lower weights of said first counterweight set are mounted on a first vertical shaft, wherein said upper and lower weights of said second counterweight set are mounted on a second vertical shaft, and wherein said drive means includes a hydraulic motor mounted on said picking head frame and a horizontal drive chain means trained around said first and second shafts and driven by said hydraulic motor.

16. A picking head as set forth in claim 15, wherein each of said rail supports comprises a pair of curved arm members extending from said picking head frame to said rails, said arm members each being pivotally connected to said picking head frame, and wherein said means for mounting said rail supports to said picking head frame has the further function of acting between said picking head frame and said arm members to resiliently hold said rails at a desired spacing from each other.

17. A harvesting machine for harvesting fruit from a row of plants, said harvesting machine comprising:
a mobile main frame adapted to straddle and move along said row, with the longitudinal centerline of said frame being in alignment with the length of said row,
an elongated picking head frame extending lengthwise of said main frame,
first and second longitudinally-spaced shaker rail supports, each rail support having an inverted-C-shape with lower opposed ends and an upper mid-portion spaced above said ends,
means for rigidly mounting the mid-portion of each of said shaker rail supports to said picking head frame for unitary movement therewith,
a pair of spaced apart and longitudinally-extending shaker rails mounted on the lower opposed ends of said shaker rails supports,
first and second longitudinally-spaced counterweight sets mounted on said picking head frame for frame, each of said first and second counterweight sets having upper and lower weights each mounted for rotation about a vertical axis,
drive means for driving said first and second counterweight sets with the direction of rotation of said first set being opposite to the direction of rotation of said second set, with the rotative force of said upper weights of said first and second sets being opposed to each other longitudinally of said picking head frame and additive to each other transversely of said shaker frame, and with the rotative force of said lower weights of said first and second sets being opposed to each other longitudinally of said picking head frame and additive to each other transversely of said picking head frame, and with the upper and lower weights of each set being 180° out of phase with each other, and
means mounting said picking head frame on said main frame for oscillatory movement of said picking head frame relative to said main frame and including a first pair of upwardly diverging links at one end of said picking head frame with the lower ends of said links being spaced apart and pivotally connected to said picking head frame and with the upper ends of said links being pivotally connectable to said main frame, and a second pair of similarly arranged links at the other ends of said picking head frame.

18. A picking head as set forth in claim 17, wherein said upper and lower weights of said first counterweight set are mounted on a first vertical shaft, wherein said upper and lower weights of said second counterweight set are mounted on a second vertical shaft, and wherein said drive means includes a hydraulic motor mounted on said picking head frame and wherein said first and second shafts are chain driven by said hydraulic motor.

* * * * *

UNITED STATES PATENT AND TRADEMARK OFFICE
CERTIFICATE OF CORRECTION

PATENT NO. : 4,621,488

DATED : November 11, 1986

INVENTOR(S) : Gerald L. Claxton

It is certified that error appears in the above-identified patent and that said Letters Patent is hereby corrected as shown below:

Col. 5, para. 1, line 1, change "bushing" to --bushings--.
Col. 5, para. 1, line 3, change "30" to --39--.
Col. 5, para. 3, line 26, change "55 and 56" to --56 and 57--.
Col. 5, para. 6, line 54, change "81 and 82" to --78 and 79--.
Col. 5, para. 6, line 55, change "axis" to --axes--.
Col. 5, para. 6, line 56, change "81" to --78--.
Col. 5, para. 6, line 57, change "83" to --81--.
Col. 5, para. 6, line 59, change "84 and 85" to --82 and 83--.
Col. 5, para. 6, line 59, change "83" to --81--.
Col. 5, para. 6, line 60, change "86 and 87" to --84 and 85--.
Col. 5, para. 6, line 61, change "84 and 85" to --82 and 83--.
Col. 5, para. 6, line 62, change "83" to --81--.
Col. 5, para. 6, line 62, change "82" to --79--.
Col. 6, para. 2, line 18, change "921" to --92--.
Col. 6, para. 3, line 28, change "further" to --furthest--.
Col. 6, para. 3, line 37, delete "out".
Col. 7, para. 2, line 7, change "6" to --5--.
Col. 7, para. 2, line 22, change "impound" to --improved--.
Col. 8, para. 3, line 25, change "1613/16" to --16-13/16--.
Col. 9, para. 3, line 16, change "75" to --78--.
Col. 9, para. 3, line 17, change "78" to --79--.
Col. 9, para. 6, line 43, change "107" to --101--.

Signed and Sealed this

Twenty-third Day of February, 1988

Attest:

DONALD J. QUIGG

*Attesting Officer*   *Commissioner of Patents and Trademarks*